3,105,766
SIMULATIVE FRUIT GRANULES AND METHOD FOR PREPARING THE SAME
Stanley Barton, Springfield Township, Hamilton County, Ohio, assignor to The Procter & Gamble Company, Cincinnati, Ohio, a corporation of Ohio
No Drawing. Filed June 7, 1961, Ser. No. 115,320
5 Claims. (Cl. 99—204)

This invention relates to a new food product and to methods for making such product. More particularly, it relates to a simulative fruit granule which, when admixed with peanut butter, provides a delicious food treat.

Many persons enjoy eating peanut butter with various other foods. Such foods frequently contain substantial amounts of moisture, as, for example, fresh fruit, jelly, jam and preserves. These aqueous food-peanut butter mixtures are prepared a short time prior to consumption. It is somewhat inconvenient to prepare the mixture since it necessitates opening a container of peanut butter and another container of the aqueous food and removing from each container a portion of food. Furthermore, it is ordinarily extremely difficult and inconvenient to determine the proper proportion of peanut butter to aqueous food required to obtain a mixture possessing the desired consistency and taste.

It would clearly be advantageous to the consumer if peanut butter and aqueous food were mixed in proper proportions in the same container. However, it is not commercially feasible to do so, because during the normal storage period—even after as short a period as a few days at room temperature—the mixture becomes dark, sticky and unfit for human consumption.

Workers in the art generally believe this undesirable chemical and physical change in the aqueous food-peanut butter mixture to be the result of the well known Maillard-type browning reaction. This reaction is believed to be a reaction of amino acid with carbohydrate—both reactants being present in peanut butter—and to be initiated by moisture.

The use of dried fruit, rather than fresh fruit, jelly, or jam may serve to obviate difficulties created by the moisture present in these aqueous foods. However, it is difficult and expensive to dehydrate fruit commercially so that it can be readily rehydrated in the form of whole pieces.

It is an object of this invention to provide a simulative fruit granule which can be intimately combined with peanut butter without undergoing undesirable physical and/or chemical changes during the normal marketing and culinary storage period.

It is a further object to provide a simulative fruit granule which when intimately combined with peanut butter imparts a taste sensation comparable to a high degree to the taste sensation imparted by fresh fruit, jelly, jam and preserves.

A still further object is to provide a simulative fruit granule containing a bland-flavored fruit, said granule being flavored and colored to simulate a more costly fruit.

Yet another object is to provide a simulative fruit granule having a consistency compatible to a high degree to the consistency of peanut butter.

Further objects and advantageous features will be apparent from the following detailed description.

The simulative fruit granule of this invention comprises an intimate mixture of from about 15% to 60% of dried, pulverulent, bland-flavored fruit selected from the group consisting of apple, white grape and mixtures thereof; from about 5% to 60% of pulverulent sugar selected from the group consisting of sucrose, glucose, dextrose, lactose and mixtures thereof; from about 3% to 25% of edible filler selected from the group consisting of starch, cereal flour and mixtures thereof; from about 10% to 30% of glycerine; fruit flavor; and from 0% to 6% water by weight based on the weight of said granule. As used herein, all percentage amounts are expressed in terms of weight on a dry solids basis unless otherwise specified.

Briefly, the method for preparing the simulative fruit granule of this invention comprises the steps of intimately dry-mixing the dehydrated, pulverulent, bland-flavored fruit, edible filler, sugar and flavoring material, and then adding glycerine to the mixture while stirring the same, thereby forming granules. It is essential to the successful practice of this invention that the constituents of the simulative fruit granule be employed within the aforementioned proportion ranges.

The fruits employed in this invention are limited to those having a bland flavor, as, for example, apple or white grape. Apple is preferred. The fruit should be in a dry and pulverulent form. If less than about 15% of dried pulverulent bland-flavored fruit is employed, granule formation is undesirably difficult, and the granule does not satisfactorily simulate fresh fruit. The use of more than about 60% of such fruit also results in granulation difficulties and increases the cost of the granule beyond that which is economically feasible.

The fruit may be dried by any known means, including vacuum drying, freeze-drying, air-drying, and foam drying. For convenience, the fruit may be ground in dried form. However, the invention is not to be limited to any particular method of preparing the pulverulent, dried fruit.

In the preferred practice of the invention the sugar constituent of the simulative fruit granule is sucrose in a pulverulent form. However, other sugars in pulverulent form such as glucose, dextrose, lactose, or mixtures thereof, can be employed. When sugar is used in a proportion less than about 5% or more than about 60%, granulation difficulties occur.

Suitable edible fillers of this invention include flour derived from the cereal group, such as wheat, rye, barley, maize (corn), oats, and rice, or mixtures thereof; edible starch derived from plants such as the above-mentioned cereals or tubers including potatoes and sweet potatoes; and mixtures of such flours and starches. In the preferred practice of the invention cornstarch is employed. Although the type of cereal flour is not to be regarded as a limitation of this invention, the use of flour derived from bland-flavored cereals, as, for example, wheat, is preferred. Granule formation is undesirably difficult when less than about 3% of edible filler is utilized, whereas the utilization of more than about 25% of such filler yields an undesirably powdery and chalky granule.

Glycerine is present in the granule to provide a composition which will have a definite form. If less than about 10% is present the granules will be undesirably crumbly. When more than about 30% of glycerine is present, the granules are undesirably sticky.

The dried fruit may contain some water without causing any problem in the formation or subsequent use of the granules. Up to about 6% of water, by weight based on the weight of the granules can be present and still provide granules which can be combined with a peanut butter and stored for a period of time equal to a normal marketing and culinary storage period with substantially no undesirable chemical and/or physical change. In general, the presence of larger amounts of moisture during the formation of the granules will result in larger granules.

It is desirable to add a small amount of fruit flavoring to achieve a similarity to a particle of fruit. Additionally, the use of coloring material may also be desirable. Other minor ingredients, such as salt, can be added.

To impart a properly mixed taste sensation of fruit and peanut butter it is desirable that the size of the simulative fruit granules to be mixed with peanut butter be from about 1/16 inch to about 1/2 inch in diameter. Yet, such size range is not an essential limitation. A variety of factors, such as the type of peanut butter, the number of granules per unit volume of peanut butter and the relative distinctiveness of the flavor of the granule, are determinative of the most desriable size in each case. Once the desired size is determined, granules of that size can be obtained by simple screening.

Moreover, the number of granules which should be combined with a unit volume of peanut butter is not essential, being determined largely both by the specific type of peanut butter and by the composition of the granule itself.

The peanut butter desirably should contain at least about 5%, by weight, of granules to have a definite fruit flavor. The presence of more than about 70%, by weight, of granules will cause the product to have an undesirable consistency and also to be lacking in peanut flavor.

It will be noted that the use of the term "peanut butter" herein is intended to include all spreadable food compositions which contain a significant amount of ground peanuts. In addition to components naturally present in peanuts, the peanut butter can also contain partially or substantially saturated glyceride fats or combinations of fats and oils added to provide the proper plasticity, sugar, honey, corn syrup, or other sweetening agents and minor amounts of salt and other additives.

Furthermore, it is evident that the simulative fruit granules of this invention can be combined with butters or spreads made from nuts other than the peanut, and such products are included in the term "nut butters." The granules can also be combined with other foods, particularly those of a confectionary nature.

The following examples are illustrative of the invention; all amounts being expressed as parts by weight on a water-free basis unless otherwise specified.

It is to be understood that Example I is intended to be illustrative both of the preferred composition of the simulative fruit granule of this invention and of the preferred method of making said granule.

Example I

| | Parts |
|---|---|
| Dehydrated applesauce (pulverulent—will pass through a U.S. standard 30 mesh screen) | 31 |
| Sucrose (baker's special sugar) | 31 |
| Cornstarch | 13 |
| Raspberry flavor (imitation) | 4 |

The above ingredients, in the proportions specified, together with a red coloring material were placed in a Sunbeam Mixmaster set at speed setting No. 1 and were dry blended. Then 21 parts of glycerine were slowly added while simultaneously mixing the ingredients in the same mixer, whereupon granules formed. Substantially all of the granules had a particle size ranging from about 1/16 to 1/2 inch.

Forty grams of the completed granules were then homogeneously mixed with ten ounces of a commercially available peanut butter and stored at a temperature of approximately 70° F. for a period of six months. At the end of this time the product was tasted and found to have an excellent flavor.

By employing the above ingredients in the specified proportions, it was not necessary to screen the granules in order to obtain the most desirable granule size.

Other natural or imitation fruit flavors and coloring materials can be substituted in the above example with comparable results.

Example II

| | Parts |
|---|---|
| Dehydrated applesauce (pulverulent—will pass through a U.S. standard 30 mesh screen) | 27 |
| Sucrose (baker's special sugar) | 27 |
| Cornstarch | 22 |
| Orange flavor | 4 |

The above ingredients, in the proportions specified, together with an orange coloring material were dry blended as described in Example I. Then 20 parts of glycerine were slowly added while simultaneously mixing the ingredients, thereby forming granules.

The granules can then be screened to the desired size and then admixed with peanut butter to form a delicious product.

Example III

| | Parts |
|---|---|
| Dehydrated applesauce (pulverulent—will pass through a U.S. standard 30 mesh screen) | 34 |
| Sucrose (baker's special sugar) | 34 |
| Cornstarch | 3 |
| Orange flavor | 4 |

The above ingredients, in the proportions specified, together with an orange coloring material were dry blended as described in Example I. Then 25 parts of glycerine were slowly added while simultaneously mixing the ingredients, thereby forming granules.

Example IV

| | Parts |
|---|---|
| Dehydrated applesauce (pulverulent—will pass through a U.S. standard 30 mesh screen) | 34 |
| Sucrose (baker's special sugar) | 34 |
| Cornstarch | 14 |
| Orange flavor | 4 |

The above ingredients, in the proportions specified, together with an orange coloring material were dry blended as described in Example I. Then 14 parts of glycerine were slowly added while simultaneously mixing the ingredients, thereby forming granules.

Example V

| | Parts |
|---|---|
| Dehydrated applesauce (pulverulent—will pass through a U.S. standard 30 mesh screen) | 17 |
| Sucrose (baker's special sugar) | 52 |
| Cornstarch | 7 |
| Orange flavor | 4 |

The above ingredients, in the proportions specified, together with an orange coloring material were dry blended as described in Example I. Then 20 parts of glycerine were slowly added while simultaneously mixing the ingredients, thereby forming granlules.

Example VI

| | Parts |
|---|---|
| Dehydrated white grape (pulverulent—will pass through a U.S. standard 30 mesh screen) | 56 |
| Sugar mixture (15 parts dextrose, 13 parts corn syrup solids and 6 parts sucrose—pulverulent) | 12 |
| Flour | 7 |
| Orange flavor | 3 |

The above ingredients, in the proportions specified, together with an orange coloring material are dry blended as described in Example I. Then 22 parts of glycerine are slowly added while simultaneously mixing the ingredients, thereby forming granules.

The granules made in Examples II through VI can be combined with peanut butter to make a delicious spread, and will not deteriorate when stored for extended periods of time.

What is claimed is:

1. Simulative fruit granules each comprising an intimate mixture of from about 15% to 60% of dried, pulverulent, bland-flavored fruit selected from the group consisting of apple, white grape and mixtures thereof; from about 5% to 60% of pulverulent sugar selected from the group consisting of sucrose, glucose, dextrose, lactose and mixtures thereof; from about 3% to 25% of edible filler selected from the group consisting of starch, cereal flour and mixtures thereof; from about 10% to 30% of glycerine; fruit flavor; and from 0% to about 6% of water, by weight based on the weight of said granules.

2. The simulative fruit granules of claim 1 wherein the dried, pulverulent, bland-flavored fruit is apple, the pulverulent sugar is sucrose, and the edible filler is cornstarch.

3. A method for preparing simulative fruit granules which comprises intimately admixing from about 15 to 60 parts of dried, pulverulent, bland-flavored fruit selected from the group consisting of apple, white grape and mixtures thereof, from about 5 to 60 parts of pulverulent sugar selected from the group consisting of sucrose, glucose, dextrose, lactose and mixtures thereof, from about 3 to 25 parts of edible filler selected from the group consisting of starch, cereal flour and mixtures thereof and fruit flavor; then adding from about 10 to 30 parts of glycerine while stirring said intimate mixture, thereby forming granules.

4. A nut butter product characterized by a resistance to chemical and physical change comprising a mixture of peanut butter and a plurality of simulative fruit granules, each of said granules comprising an intimate mixture of from about 15% to 60% dried, pulverulent, bland-flavored fruit selected from the group consisting of apple, white grape and mixtures thereof; from about 5% to 60% pulverulent sugar selected from the group consisting of sucrose, glucose, dextrose, lactose, and mixtures thereof; from about 3% to 25% edible filler selected from the group consisting of starch, cereal flour and mixtures thereof; from about 10% to 30% glycerine; fruit flavor; and from 0% to about 6% water by weight based on the weight of said granules.

5. The nut butter product of claim 4 wherein the dried, pulverulent, bland-flavored fruit is apple, the pulverulent sugar is sucrose, and the edible filler is cornstarch.

References Cited in the file of this patent

UNITED STATES PATENTS

| | | |
|---|---|---|
| 1,696,766 | Howe | Dec. 25, 1928 |
| 2,358,086 | Mollner et al. | Sept. 12, 1944 |
| 2,976,159 | Swisher | Mar. 21, 1961 |